United States Patent [19]

Lee et al.

[11] Patent Number: 5,860,231
[45] Date of Patent: Jan. 19, 1999

[54] DEVICE AND METHOD FOR AUTOMATICALLY VIBRATING WORKING MEMBERS OF POWER CONSTRUCTION VEHICLES

[75] Inventors: Jin Han Lee; Seong Soo Chun, both of Changwon, Rep. of Korea

[73] Assignee: Samsung Heavy Industries Co., Ltd., Rep. of Korea

[21] Appl. No.: 762,986

[22] Filed: Dec. 10, 1996

[30] Foreign Application Priority Data

Apr. 30, 1996 [KR] Rep. of Korea .................. 1996 13961

[51] Int. Cl.$^6$ ........................................ E02F 5/02
[52] U.S. Cl. .................... 37/348; 37/904; 701/50; 172/2
[58] Field of Search ............... 37/348, 382, 904; 701/50; 172/2, 10; 414/699, 694; 175/24, 27, 1; 91/517; 60/426, 420; 404/117

[56] References Cited

U.S. PATENT DOCUMENTS

| | | | |
|---|---|---|---|
| 4,149,253 | 4/1979 | Paar et al. .................................. | 701/50 |
| 4,330,738 | 5/1982 | Paramythioti et al. .................. | 318/128 |
| 4,332,517 | 6/1982 | Igarashi et al. ............................ | 701/50 |
| 4,518,044 | 5/1985 | Wiegardt et al. ............................ | 172/7 |
| 4,546,425 | 10/1985 | Breitholtz ............................. | 404/117 X |
| 4,881,450 | 11/1989 | Hirata et al. ............................... | 91/459 |
| 5,170,342 | 12/1992 | Nakamura et al. .................... | 701/50 X |
| 5,224,033 | 6/1993 | Nakamura et al. ................. | 364/167.01 |
| 5,244,306 | 9/1993 | Artzberger ............................. | 37/403 X |
| 5,287,280 | 2/1994 | Yamamoto et al. ................... | 701/50 X |
| 5,293,944 | 3/1994 | Matsumoto ................................ | 172/2 |
| 5,297,649 | 3/1994 | Yamamoto et al. .................. | 701/50 X |

Primary Examiner—Terry Lee Melius
Assistant Examiner—Victor Batson
Attorney, Agent, or Firm—Harness, Dickey & Pierce, P.L.C.

[57] ABSTRACT

A device and method for automatically vibrating the working members of a power construction vehicle such as a power excavator is disclosed. The device and method effectively change both the amplitude of vibration and the number of vibrations of a working member in proportion to a levering angle of an associated control lever during an excavating, breaking or ground hardening operation of a construction vehicle. The automatic vibration device is thus free from any select switch. The device simplifies the construction of the hydraulic system and more easily controls the automatic vibration operations, and thereby is convenient to operators.

4 Claims, 2 Drawing Sheets

DEVICE AND METHOD FOR AUTOMATICALLY VIBRATING WORKING MEMBERS OF POWER CONSTRUCTION VEHICLES

BACKGROUND OF THE INVENTION

1. Field of the Invention

The present invention relates, in general, to a device and method for automatically vibrating the working members of a power construction vehicle such as power excavator and, more particularly, to an automatic vibration device and method effectively used for performing an excavating, breaking or ground hardening operation of a power construction vehicle provided with a plurality of working members such as an arm, boom and bucket.

2. Description of the Prior Art

As well known to those skilled in the art, during an excavating, breaking or ground hardening operation of a power excavator, it is possible for the bucket or breaker to be overloaded. Therefore, the control levers of an excavator are manually levered by an operator during such an excavating, breaking or ground hardening operation. However, such a manual operation is inconvenient to the operators, so that it is necessary to automatically control the hydraulic system of an excavator during such an excavating, breaking or ground hardening operation. In order to achieve the above object, the following automatic vibration devices are used in the prior art. A typical automatic vibration device automatically and repeatedly reciprocates an arm, boom or bucket cylinder, which is associated with a necessary operation, and thereby automatically vibrates an associated working member such as an arm, boom or bucket. Another typical vibration device changes the amplitude of vibration of the working members in response to an electric signal generated from the control levers, thereby being somewhat convenient to an operator who levers the control levers during an excavating or ground hardening operation of an excavator. FIG. 2 shows a typical automatic vibration device for power construction vehicles, which is disclosed in Japanese Patent Publication No. Hei. 6-99948. As shown in FIG. 2, the Japanese vibration device includes a plurality of switches: an auto-vibration switch 10, a vibration mode switch 11 and a working mode switch 12. When the auto-vibration switch 10 is turned on, signals output from the two mode switches 11 and 12 are input into a controller 9. Upon receiving the signals from the mode switches 11 and 12, the controller 9 operates the signals and outputs electric control signals to a proportional control valve. The proportional control valve thus controls an associated directional control valve in response to the current control signal from the controller 9, thereby causing the directional control valve to intermittently feed pressurized fluid from a hydraulic pump to an actuator 13. For example, the Japanese automatic vibration device may automatically reciprocate the actuator 13 thereby vibrating an associated working member while bringing the relation between the amplitude (e1) of vibration in an up-motion of the actuator 13 and the amplitude (e2) of vibration in a down-motion of the actuator 13 into e1=e2. The above vibration device also may input levering signals, corresponding to levering angles of the control levers 8, into the controller 9 which operates the levering signals. After operating the levering signal, the controller 9 outputs a current control signal in order to automatically reciprocate the actuator 13 thereby vibrating the working member while changing movement of a spool in the directional control valve and bringing the relation between the two amplitudes (e1 and e2) of vibration into e1>e2 or e1<e2.

However, the above automatic vibration device during a vibration operation exclusively changes the amplitude of vibration of a working member in response to the levering signals from the control levers 8. Thus, it is necessary to use another select switch in order to change the number of vibrations of the working member during a vibration operation.

Another problem of the above automatic vibration device resides in that it necessarily has a select switch in order to select a working member, for example, an arm, boom or bucket, to be vibrated.

SUMMARY OF THE INVENTION

It is, therefore, an object of the present invention to provide a device and method for automatically vibrating the working members of a power construction vehicle such as a power excavator in which the above problems can be overcome and which effectively change both the amplitude of vibration and the number of vibrations of a working member in proportion to a levering angle of an associated control lever during an excavating, breaking or ground hardening operation of a construction vehicle, and which simplifies the construction of the hydraulic system and more easily controls the automatic vibration operations, and thereby is convenient to operators.

In an aspect, the present invention provides a device for automatically vibrating a working member of a power construction vehicle, comprising a hydraulic pump, an actuator operated by pressurized fluid output from the pump thereby moving the working member, and a directional control valve mounted to a fluid line, extending between the pump and control valve, in order to control movement of the actuator, further comprising: a control lever selectively levered by an operator in order to input a levering angle for controlling the actuator; a potentiometer converting the input levering angle of the control lever into a voltage signal; an auto-vibration switch selectively turned on or off in order to switch the operational mode of the actuator between a normal-operation mode and an auto-vibration mode; a controller receiving both the voltage signal from the potentiometer and a signal from the auto-vibration switch as input signals when the auto-vibration switch is turned on, operating the input signals using both a stored vibration amplitude proportional constant and a stored vibration number proportional constant, converting the signal operating results into a current signal, and outputting the current signal; and an electronic proportional control valve receiving the current signal from the controller and controlling spool movement of the directional control valve in response to the current signal, thereby controlling the flow rate and flow direction of the pressurized fluid fed from the pump to the actuator.

In another aspect, the present invention provides a method for automatically vibrating a working member of a power construction vehicle by turning on an auto-vibration switch and by automatically and intermittently reciprocating an actuator associated with the working member, comprising the steps of: inputting a voltage signal indicative of a levering angle for controlling the actuator through a control lever when the auto-vibration switch is turned on; performing a signal operation in accordance with both a vibration amplitude proportional constant and a vibration number proportional constant in proportion to the input voltage signal, thereby determining both the number of vibrations and the amplitude of vibration; outputting a current signal indicative of both the number of vibrations and the amplitude of vibration determined in the signal operation step; and intermittently feeding pressurized fluid from a hydraulic pump to the actuator in response to the current signal.

In accordance with the preferred embodiment, the signal operation step comprises the steps of: setting either of the proportional constants to zero by levering the control lever in one direction during an automatic control mode; and restoring an existing zero constant to an original valve thereof while simultaneously setting the other constant to zero by levering the control lever in the other direction, thereby selectively changing the number of vibrations or the amplitude of vibration in accordance with a levered direction of the control lever.

In accordance with another embodiment, the present invention provides a method for automatically vibrating a working member of a power construction vehicle by turning on an auto-vibration switch and by automatically performing an intermittent reciprocating motion of an actuator associated with the working member, comprising the steps of: automatically performing the intermittent reciprocating motion of the actuator, with both the number of vibrations and the amplitude of vibration being preset in accordance with a selected operation; and when a control lever associated with the actuator is levered by an operator, automatically vibrating the working member while changing both the number of vibrations and the amplitude of vibration in accordance with a levering angle of the control lever.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
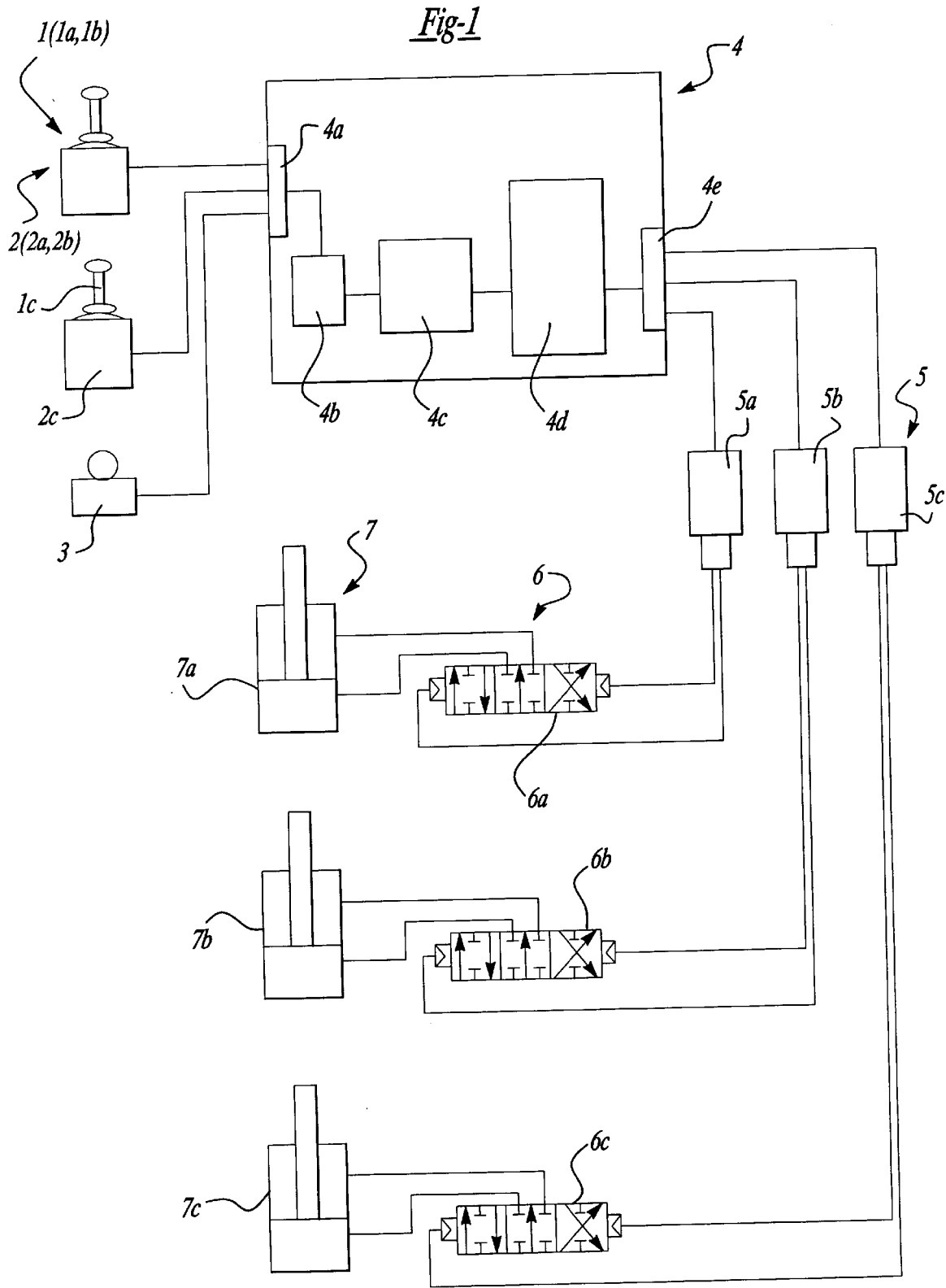
FIG. 1 is a circuit diagram showing the hydraulic circuit of the automatic vibration device for power construction vehicles in accordance with the preferred embodiment of the present invention.
Figure 2:
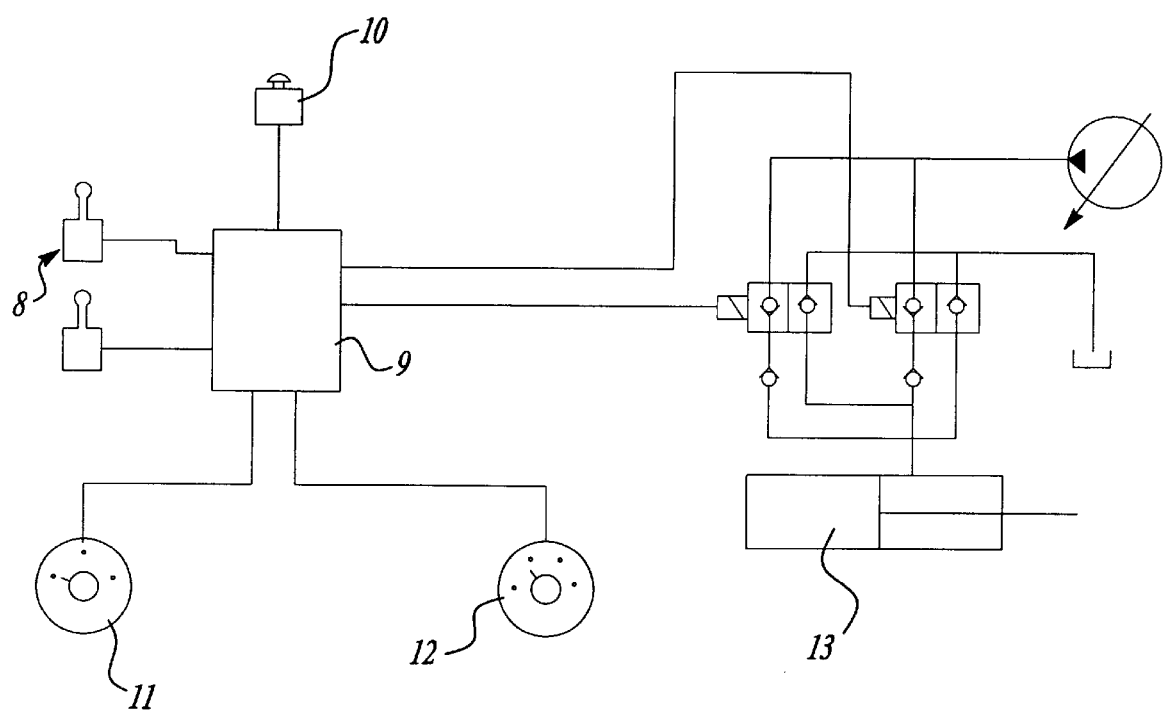
FIG. 2 is a circuit diagram showing the hydraulic circuit of a typical automatic vibration device for power construction vehicles.

FIG. 1 is a circuit diagram showing the hydraulic circuit of the automatic vibration device for power construction vehicles in accordance with the preferred embodiment of the present invention.

As shown in FIG. 1, the automatic vibration device of this invention has two control levers 1, which are selectively levered by an operator in order to input levering angles for controlling a plurality of actuators 7. A potentiometer 2 converts the input levering angles of the control levers 1 into voltage signals. The vibration device also includes a controller 4, which receives the voltage signal from the potentiometer 2 and operates the input voltage signal, and outputs the signal operating results in the state of current control signals to an electronic proportional control valve 5. Upon receiving the current control signals from the controller 4, the proportional control valve 5 outputs a pilot pressure in order to control a directional control valve 6 in response to the current control signals, thereby controlling the flow rate and flow direction of pressurized fluid fed from a hydraulic pump to the actuators 7. In the preferred embodiment, the actuators 7 comprise boom, bucket and arm cylinders 7a, 7b and 7c, which are automatically vibrated in accordance with levering motions of the control levers 1. The vibration device further includes an auto-vibration switch 3, which is selectively turned on or off in order to switch the operational mode of the actuators 7 between a normal-operation mode and an auto-vibration mode. The switch 3 outputs an on/off signal to the controller 4 when it is turned on or off.

The controller 4 has an input port 4a, ROM 4b, CPU 4c, AMP circuit 4d and output port 4e. The input port 4a receives both a voltage signal from the potentiometer 2 and an on/off signal from the auto-vibration switch 3. The ROM 4b stores both a vibration amplitude proportional constant k1 and a vibration number proportional constant k2. The CPU 4c performs a signal operation in accordance with both proportional constants k1 and k2 of the ROM 4b in proportion to the input signals, which is input into the controller 4 through input port 4a. The AMP circuit 4d outputs a current signal in response to an output signal of the CPU 4c. The output port 4e outputs the current signal of the AMP circuit 4d to the electronic proportional control valve 5.

The operational effect of the above device will be described hereinbelow.

When the auto-vibration switch 3 is turned on, the operational mode of the actuators (boom, bucket and arm cylinders) 7 is converted from a normal-operation mode, which effectively performs an excavating, lifting and loading operations, into an auto-vibration operation. In the above case, both the amplitude of vibration and the number of vibrations of the actuators 7 are controlled by levering the control levers 1.

For example, when the boom control lever 1a is levered to a boom-up or boom-down position after turning on the switch 3, the potentiometer 2a of the boom control lever 1a converts a levering angle of the boom control lever 1a into a voltage signal, and outputs the voltage signal to the input port 4a of he controller 4. Upon receiving the voltage signal from the potentiometer 2a, the CPU 4c performs a signal operation in accordance with instructions of the ROM 4b, which outputs a current signal in order to change both the amplitude of vibration and the number of vibrations in accordance with both proportional constants k1 and k2 in proportion to the input voltage signal. The controller 4 outputs the current signal to the boom proportional control valve 5a through the AMP circuit 4d and output port 4e. Therefore, the boom control valve 6a is operated by the pilot pressure output from the boom proportional control valve 5a, thereby automatically vibrating the boom cylinder 7a with both the preset amplitude of vibration and the preset number of vibrations.

When the boom control lever 1a is levered into a neutral position, the potentiometer 2a of the lever 2a outputs a voltage signal corresponding to the neutral position of the lever 1a to the input port 4a of the controller 4. Upon receiving the voltage signal from the potentiometer 2a, the CPU 4c performs a signal operation in accordance with instructions of the ROM 4b, which outputs a current signal in order to bring the relation between the amplitude A of vibration and the number B of vibrations into A=B in accordance with the input voltage signal indicative of the neutral position of the lever 1a. The controller 4 outputs the current signal to the boom proportional control valve 5a through the AMP circuit 4d and output port 4e. In this state, the boom cylinder 7a is not operated.

During a bucket or arm auto-vibration mode of the above automatic vibration device, the bucket or arm control lever 1b, 1c, associated potentiometer 2b, 2c, and bucket or arm cylinder 7b, 7c are operated in the same manner as that described for the boom auto-vibration mode and further explanation is thus not deemed necessary.

In the above preferred embodiment, the ROM 4b outputs a current signal in order to change both the amplitude of vibration and the number of vibrations in accordance with both proportional constants k1 and k2 in proportion to the current amount of an input voltage signal regardless of a boom-up or boom-down levering signal of the boom control lever 1a. However in accordance with a second embodiment of this invention, the vibration amplitude proportional constant k1 of the ROM 4b becomes zero (k1=0) when the potentiometer 2a of the boom control lever 1a outputs a boom-up voltage signal. In the above state, the controller 4 outputs a current signal in order to exclusively change the number of vibrations in proportion to the output current signal. In addition, the vibration number proportional constant k2 of the ROM 4b becomes zero (k2=0) when the potentiometer 2a of the boom control lever 1a outputs a boom-down voltage signal. In the above state, the controller 4 outputs a current signal in order to exclusively change the amplitude of vibration in proportion to the output current signal.

In the second embodiment, the bucket or arm control lever, associated potentiometer, and bucket or arm cylinder are operated in the same manner as that described for the boom auto-vibration mode and further explanation is thus not deemed necessary.

As described above, the present invention provides a device and method for automatically vibrating the working members of a power construction vehicle such as a power excavator. The device and method effectively change both the amplitude of vibration and the number of vibrations of a working member in proportion to a levering angle of an associated control lever during an excavating, breaking or ground hardening operation of a construction vehicle. The automatic vibration device is thus free from any select switch. The device simplifies the construction of the hydraulic system and more easily controls the automatic vibration operations, and thereby is convenient to operators.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A device for automatically vibrating a working member of a power construction vehicle, comprising a hydraulic pump, an actuator operated by pressurized fluid output from said pump thereby moving said working member, and a directional control valve mounted to a fluid line, extending between said pump and control valve, in order to control movement of said actuator, further comprising:

a control lever selectively levered by an operator in order to input a levering angle for controlling said actuator;

a potentiometer converting the input levering angle of the control lever into a voltage signal;

an auto-vibration switch selectively turned on or off in order to switch the operational mode of said actuator between a normal-operation mode and an auto-vibration mode;

a controller receiving both the voltage signal from said potentiometer and a signal from said auto-vibration switch as input signals when said auto-vibration switch is turned on, operating said input signals using both a stored vibration amplitude proportional constant and a stored vibration number proportional constant, converting the signal operating results into a current signal, and outputting said current signal; and an electronic proportional control valve receiving said current signal from the controller and controlling spool movement of said directional control valve in response to said current signal, thereby controlling the flow rate and flow direction of the pressurized fluid fed from said pump to said actuator.

2. A method for automatically vibrating a working member of a power construction vehicle by turning on an auto-vibration switch and by automatically and intermittently reciprocating an actuator associated with said working member, comprising the steps of:

inputting a voltage signal indicative of a levering angle for controlling said actuator through a control lever when said auto-vibration switch is turned on;

performing a signal operation in accordance with both a vibration amplitude proportional constant and a vibration number proportional constant in proportion to said input voltage signal, thereby determining both the number of vibrations and the amplitude of vibration;

outputting a current signal indicative of both the number of vibrations and the amplitude of vibration determined in the signal operation step; and intermittently feeding pressurized fluid from a hydraulic pump to said actuator in response to said current signal.

3. The method according to claim 2, wherein said signal operation step comprises the steps of:

setting either of said proportional constants to zero by levering said control lever in one direction during an automatic control mode; and restoring an existing zero constant to an original value thereof while simultaneously setting the other constant to zero by levering the control lever in another direction, thereby selectively changing the number of vibrations or the amplitude of vibration in accordance with a levered direction of said control lever.

4. A method for automatically vibrating a working member of a power construction vehicle by turning on an auto-vibration switch and by automatically performing an intermittent reciprocating motion of an actuator associated with said working member, comprising the steps of:

automatically performing said intermittent reciprocating motion of the actuator, with both the number of vibrations and the amplitude of vibration being preset in accordance with a selected operation; and when a control lever associated with said actuator is levered by an operator, automatically vibrating said working member while changing both the number of vibrations and the amplitude of vibration in accordance with a levering angle of said control lever.

* * * * *